(12) United States Patent
Rockwell, Jr.

(10) Patent No.: US 6,582,219 B1
(45) Date of Patent: Jun. 24, 2003

(54) TORCH ILLUMINATION DEVICE

(76) Inventor: Charles T. Rockwell, Jr., 29 Miller Ave., Troy, NY (US) 12180

( * ) Notice: Subject to any disclaimer, the term of this patent is extended or adjusted under 35 U.S.C. 154(b) by 0 days.

(21) Appl. No.: 09/672,433

(22) Filed: Sep. 28, 2000

(51) Int. Cl.[7] .................................................. F23Q 2/32
(52) U.S. Cl. ........................ 431/253; 431/345; 362/109
(58) Field of Search ................................. 431/253, 126, 431/255, 343, 344, 345; 362/253, 119, 92, 109, 418, 120; 219/220, 230

(56) References Cited

U.S. PATENT DOCUMENTS

| | | | |
|---|---|---|---|
| 389,264 A | 9/1888 | Thompson | 431/253 |
| 1,215,693 A | 2/1917 | Orme | 362/253 |
| 2,029,487 A | 2/1936 | Kleine | 362/119 |
| 2,075,883 A * | 4/1937 | Britsch | 431/253 |
| 2,588,288 A | 3/1952 | Pohanka | 362/119 |
| 3,023,306 A | 2/1962 | Kester | 362/119 |
| 3,711,240 A | 1/1973 | Warshaw | 431/253 |
| 4,302,797 A | 11/1981 | Cooper | 362/119 |
| 4,578,561 A | 3/1986 | Corby, Jr. et al. | 219/124.34 |
| 4,666,399 A | 5/1987 | Nelson | 431/344 |
| 4,670,821 A * | 6/1987 | Treadway | 362/109 |
| 4,799,132 A | 1/1989 | Perlsweig | 362/118 |
| 4,816,971 A * | 3/1989 | Chin | 431/253 |
| 4,954,078 A | 9/1990 | Nelson | 431/255 |
| 5,226,810 A * | 7/1993 | Novinsky | 431/253 |
| 5,797,670 A | 8/1998 | Snoke et al. | 362/119 |
| 5,816,794 A * | 10/1998 | Tsai | 431/344 |
| 5,971,750 A | 10/1999 | Ho | 431/253 |
| 6,012,916 A * | 1/2000 | Liang | 431/255 |

FOREIGN PATENT DOCUMENTS

| | | | |
|---|---|---|---|
| DE | 35 27 487 A | * | 6/2002 |
| JP | 2-61420 A | * | 3/1990 |
| WO | WO 96/29547 | | 9/1996 |

* cited by examiner

Primary Examiner—Henry Bennett
Assistant Examiner—Josiah Cocks
(74) Attorney, Agent, or Firm—Schmeiser, Olsen & Watts

(57) ABSTRACT

The present invention relates generally to an illumination device. More particularly, the present invention relates to providing an illumination device included in a portable gas torch apparatus. A control element in a first position, selects a light switch apparatus for turning on or off a light to illuminate the object being heated or soldered. In a second position, the control element selects a gas flow control apparatus for turning on or off the portable gas torch gas flow. In a third position, the control element selects an ignition apparatus for igniting the gas in a burner region of the gas torch.

15 Claims, 7 Drawing Sheets

TORCH ILLUMINATION DEVICE

FIELD OF THE INVENTION

The present invention relates generally to an illumination device. More particularly, the present invention relates to providing an illumination device included in a portable gas torch apparatus.

BACKGROUND OF THE INVENTION

Portable gas torches are typically used in applications such as plumbing to heat objects such as pipe or tubing joints. A joining compound such as solder is applied to the joint for sealing the joint. On numerous occasions, the joint to be soldered is located in a dark or lowly illuminated location such as under a sink. Sometimes, the construction site is not illuminated and at night supplemental illumination is required. Before the gas torch is lit, a flashlight is required for allowing an operator, such as a plumber, to see the joint. The plumber may have to hold the flashlight in his mouth while holding the gas torch in one hand and the solder in the other hand. Another person may sometimes be required to hold the flashlight to illuminate the joint to be soldered. Typically, many joints need to be soldered in construction of a building so that time wasted results in additional construction expenses.

SUMMARY OF THE INVENTION

The present invention provides an illumination device included in a portable gas torch. The illumination device includes a light producing apparatus that shines light onto an object before the gas torch is lit. The illumination a device may include a control element for selecting the mode of the portable gas torch operation. In a first position, the control element selects a light switch apparatus for turning on a light in the light producing apparatus. The light producing apparatus illuminates the object being heated or soldered. In a second position, the control element selects a gas flow control apparatus for turning on the portable gas torch gas flow. In a third position, the control element selects an ignition apparatus for igniting the gas in a burner region of the gas torch. The control element may be included in a handle of the portable gas torch so that by using only one hand, an operator may illuminate the object to be heated, turn on the gas flow, and may ignite the gas.

BRIEF DESCRIPTION OF THE DRAWINGS

The features of the present invention will best be understood from a detailed description of the invention selected for the purposes of illustration and shown in the accompanying drawings in which.

DETAILED DESCRIPTION OF THE INVENTION

Figure 3:
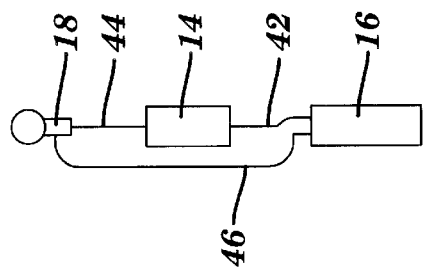
FIG. 3 illustrates a schematic view of an electrical circuit of the illumination device.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Figure 1:
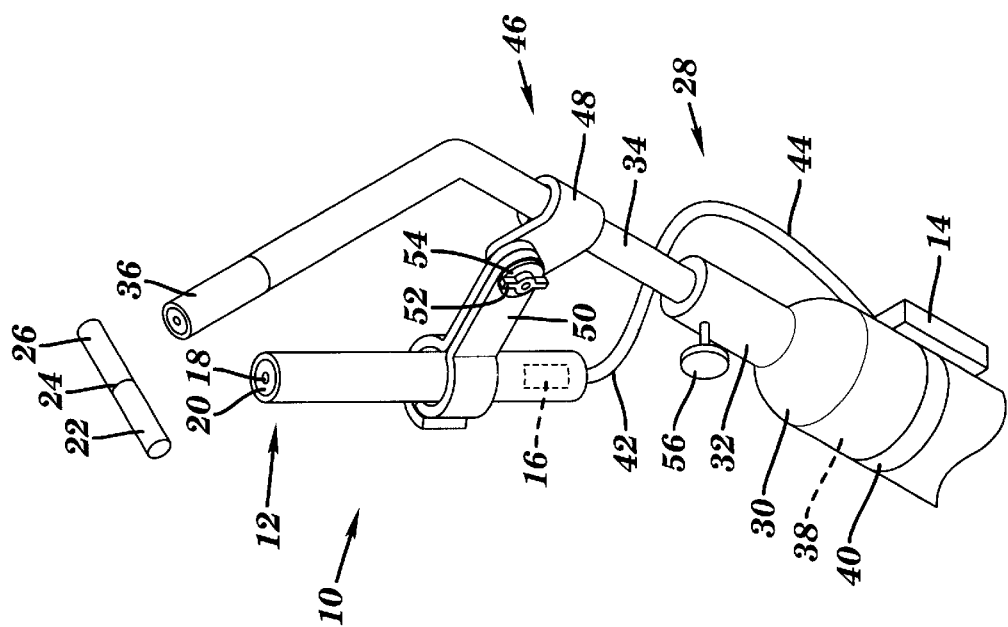
FIG. 1 illustrates a perspective view of a portable gas torch including an illumination device including a light producing apparatus and a pressure switch attached to a gas tank in accordance with a first embodiment.

FIG. 1 illustrates an illumination device 10 including a light producing apparatus 12 and a switch 14. The light producing apparatus 12 may include any suitable device (e.g., flashlight, penlight, etc.). The light producing apparatus 12 includes a power supply 16, a light source 18, and a lens 20. The power supply 16 may be any suitable source (e.g., battery, rechargeable battery, ac power, etc.). The light source 18 may be any suitable element (e.g., light bulb, flourescent bulb, etc.). The lens 20 focuses the light from the light source 18 onto an object 22. The object 22 may be any structure that requires illumination such as a joint 24 on a pipe 26 to be soldered. The illumination device 10 is attached to a portable gas torch 28.

The portable gas torch 28 includes a tank 30, a gas control valve 32, a tube 34 and a tip 36. The tank 30 stores a gas 38. The gas 38 may be any suitable gas (e.g., propane, liquefied petroleum gas with methylacetylene-propadiene (MAPP), etc.). The gas 38 flows from the tank 30 through the gas control valve 32, through the tube 34, and through the tip 36 where a flame is produced that heats the joint 24 of the pipe 26 to be soldered. An adjustment knob 56 on the gas control valve 32 may be rotated to adjust the flow rate of the gas 38.

The switch 14 of the illumination device 10 is attached to the tank 30 by any suitable means, such as a belt 40. The switch 14 may be any suitable switch (e.g., push button, slide switch, pressure sensitive switch, etc.). An electrical circuit diagram of the illumination device 10 is illustrated in FIG. 3. The power supply 16 is connected to the switch 14 by a conduit 42. The switch 14 is connected to the light source 18 by a conduit 44. A conduit 46 connects the light source 18 with the power supply 16. Activation of the switch 14 completes the electrical circuit and allows electrical current to flow through the light source 18. The light source 18 illuminates the object 22.

Figure 4:
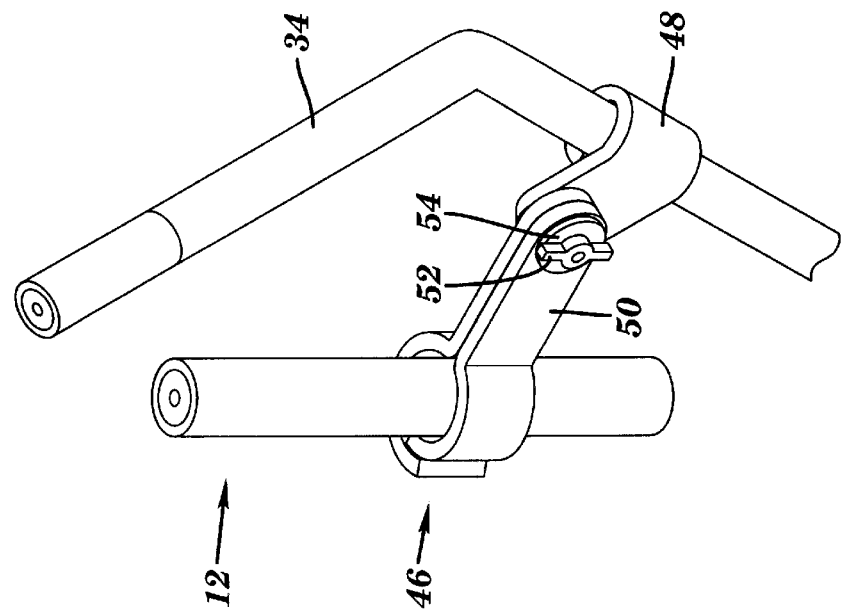
FIG. 4 illustrates a perspective view of a light producing apparatus attached to a gas tube with an adjustable clamping device.
Figure 2:
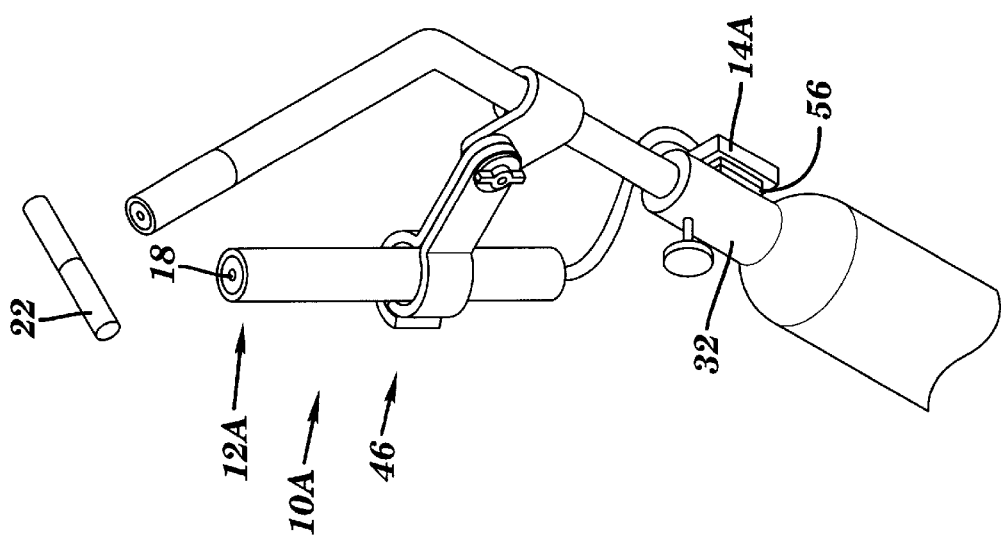
FIG. 2 illustrates a perspective view of the portable gas torch including a second embodiment of the illumination device including the pressure switch attached to a portion of a gas control valve.

The light producing apparatus 12 is attached to the tube 34 of the portable gas torch 28 by a clamping apparatus 46. The clamping apparatus 46 is illustrated in FIGS. 1, 2, and 4 and includes a first clamping bracket 48, a second clamping bracket 50, a wing nut 52 and a threaded screw 54. The first clamping bracket 48 clamps onto the tube 34 of the portable gas torch 28. The second clamping bracket 50 clamps to the light producing apparatus 12. The wing nut 52 and the threaded screw 54 adjustably attach the second clamping bracket 50 with the first clamping bracket 48. An operator may tighten or loosen the wing nut 52 to secure the light producing apparatus 12 into a selected position. This adjustability allows the operator to aim the light from the light producing apparatus 12 to illuminate the desired object 22.

When working in a dark location, the operator may grasp the tank 30 with one hand while simultaneously pressing upon the switch 14. The light source 18 provides illumination in the dark so that the operator may easily view the object 22 to be worked on. This light is very helpful when the operator is working in a tight dark confined space, such as under a sink in a kitchen.

A second embodiment of an illumination device 10A is illustrated in FIG. 2. In this embodiment, the switch 14A of the light producing apparatus 12A is attached to the gas control valve 32. The switch 14A may be attached to the gas control valve 32 using any suitable fastener 56 (e.g., hook and loop fasteners, glue, adhesive tape, clamps, straps, etc.). The operator may simultaneously grasp the gas control valve 32 and the switch 14A. This lights the light source 18 of the illumination device 10A and provides illumination on the object 22.

Figure 5:
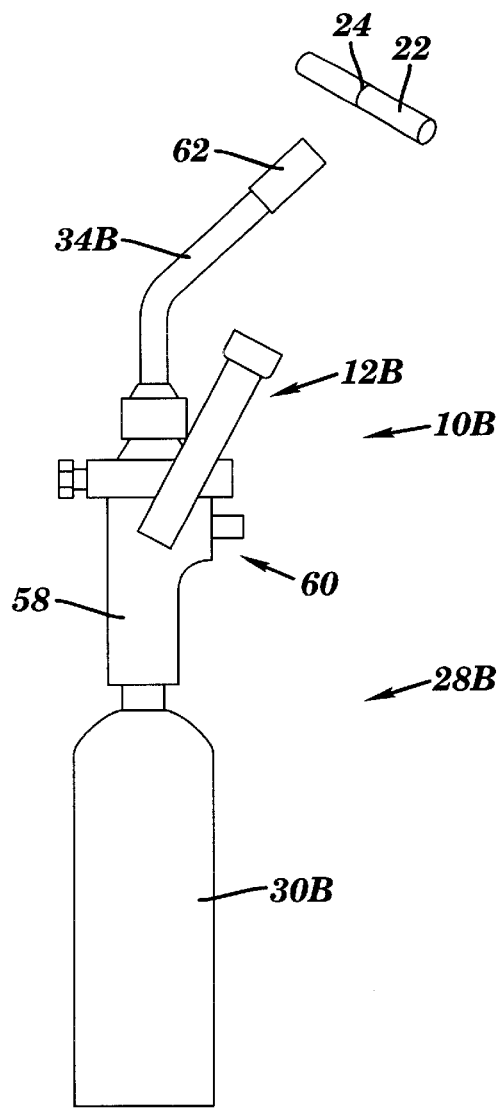
FIG. 5 illustrates a side view of another embodiment of the illumination device including a handle in accordance with a third embodiment of a portable gas torch.
Figure 6:
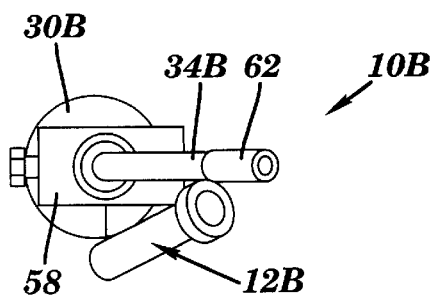
FIG. 6 illustrates a plan view of the illumination device of FIG. 5.

FIG. 5 illustrates a side view of a third embodiment of an illumination device 10B including a light producing apparatus 12B, a control apparatus 60, and a handle 58 of a portable gas torch 28B. The light producing apparatus 12B is attached to the handle 58. The portable gas torch 28B includes a tank 30B, the handle 58, a tube 34B, and a burner 62. The light producing apparatus 12B provides illumination on the object 22. FIG. 6 illustrates a plan view of the illumination device 10B.

Figure 7:
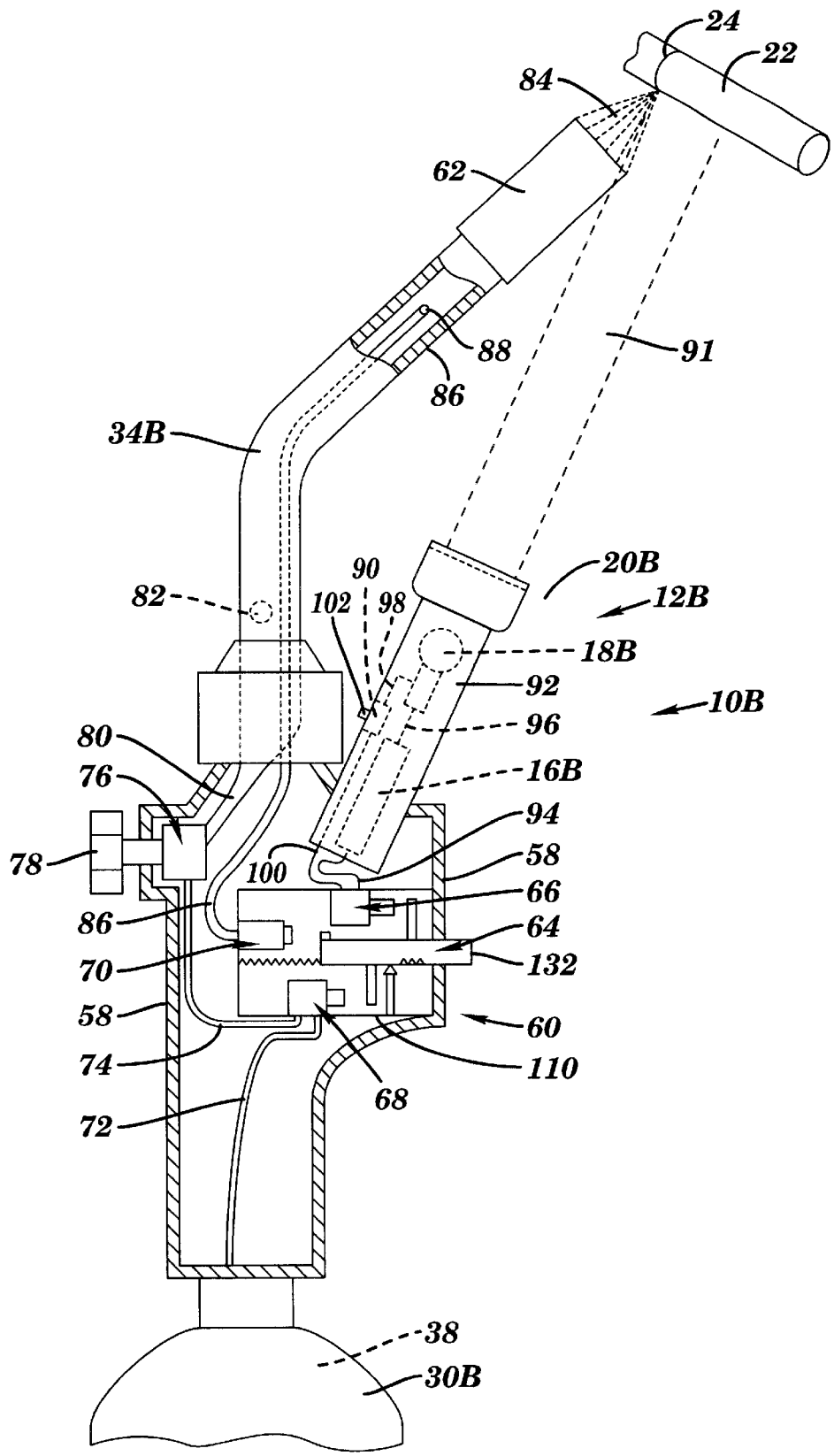
FIG. 7 illustrates a partial cross-sectional view of the illumination device of FIG. 5.

FIG. 7 illustrates a partial cross-sectional side view of the illumination device 10B including the handle 58. The control apparatus 60 includes a control element 64, a light switch apparatus 66, a gas flow control apparatus 68, and a ignition apparatus 70. A conduit 72 connects the tank 30B with the gas flow control apparatus 68. The tank 30B stores a gas supply 38. The gas 38 flows from the tank 30B through the conduit 72 to the gas flow control apparatus 68. The gas flow control apparatus 68 may stop or allow gas 38 flow from the conduit 72 to a conduit 74. The conduit 74 connects the gas flow control apparatus 68 with a pressure regulator valve 76. The pressure regulator valve 76 includes a control knob 78 that may be rotated to select a desired pressure of gas 38. A conduit 80 connects the pressure regulator valve 76 with the tube 34B. A burner 62 is connected to the tube 34B. The tube 34B may include an air inlet port 82. The air inlet port 82 allows air to enter the tube 34B to mix with the gas 38. Therefore, gas 38 may flow from the tank 30B, through the conduit 72, through the gas flow control apparatus 68, through the conduit 74, through the pressure regulator valve 76, through the conduit 80, through the tube 34B and through the burner 62. The gas 38 may burn in the burner 62 and the resulting flame 84 may be directed onto a selected object 22. The selected object 22 may include a joint 24 to be soldered.

As illustrated in FIG. 7, the control apparatus 60 includes the ignition apparatus 70. The ignition apparatus 70 may include any spark producing ignition source, such as a piezoelectric spark generator. An electrical conduit 86 carries the electrical current from the ignition apparatus 70 to a sparking element 88. The sparking element 88 ignites the gas 38 and air mixture in the tube 34B and a flame is developed that exits the burner 62.

The light producing apparatus 12B includes a power supply 16B, a light source 18B, a lens 20B, an override switch 90 and a body 92. The power supply 16B may be any suitable source (e.g., battery, rechargeable battery, ac power, etc.). The light source 18B may be any suitable element (e.g., light bulb, flourescent bulb, etc.). The lens 20B focuses a light 91 from the light source 18B onto the object 22. The light switch apparatus 66 is connected to the power supply 16B by a conduit 94. A conduit 96 connects the power source 16B with the light source 18B. A conduit 98 connects the light source 18B with the override switch 90. A conduit 100 connects the override switch 90 with the light switch apparatus 66. The override switch 90 includes a switch arm 102 which the operator may move to open or close the override switch 90 which stops current or allows current to flow between the conduit 98 and the conduit 100. Activating the light switch apparatus 66 and closing the override switch 90 allows current to flow from the power supply 16B, through the conduit 96, through the light source 18B, through the conduit 98, through the override switch 102, through the conduit 100, through the light switch apparatus 66 and through the conduit 94 back to the power supply 16B. The light 91 generated by the light source 18B passes through the lens 20B and illuminates the object 22.

Figure 8:
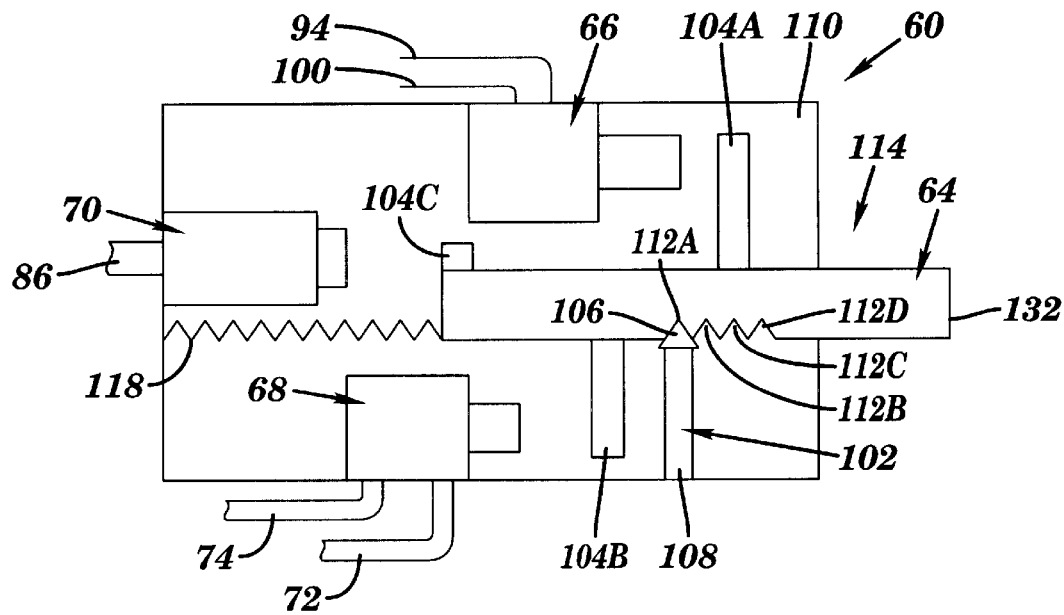
FIG. 8 illustrates a schematic view of a control apparatus including a single control element in a neutral position.

The control apparatus 60 is illustrated in more detail in FIGS. 8–11. The control apparatus 60 includes the control element 64, the light switch apparatus 66, the gas flow control apparatus 68, the ignition apparatus 70, a housing 110, and a detent apparatus 102. The housing 110 is attached to the handle 58 (FIG. 7). FIG. 8 illustrates the control element 64 in a "neutral position" which means that the light switch apparatus 66, the gas flow control apparatus 68, and the ignition apparatus 70 are not activated. The control element 64 includes a first member 104A, a second member 104B, and a third member 104C. The detent apparatus 102 includes a tip member 106 and a support member 108. The support member 108 is attached to the housing 110 and the tip member 106 is resiliently attached to the support member 108 and is biased toward the control element 64. The control element 64 includes a first notch 112A, a second notch 112B, a third notch 112C, and a forth notch 112D. The tip member 106 engages with each notch 112A–112D as each notch passes over the support member 108. This engagement assists the operator in locating a "neutral position" 114 (FIG. 8), a first position 116A (FIG. 9), a second position 116B (FIG. 10), and a third position 116C (FIG. 11) of the control element 64. The engagement pressure created between the tip member 106 and each notch 112A–112D is at a level that still allows the operator to move the control element 64 from one position to another. A resilient member 118, such as a spring, is attached between the housing 110 and the control element 64. The resilient member 118 returns the control element 64 to the "neutral position" whenever the operator releases the control element 64.

Figure 9:
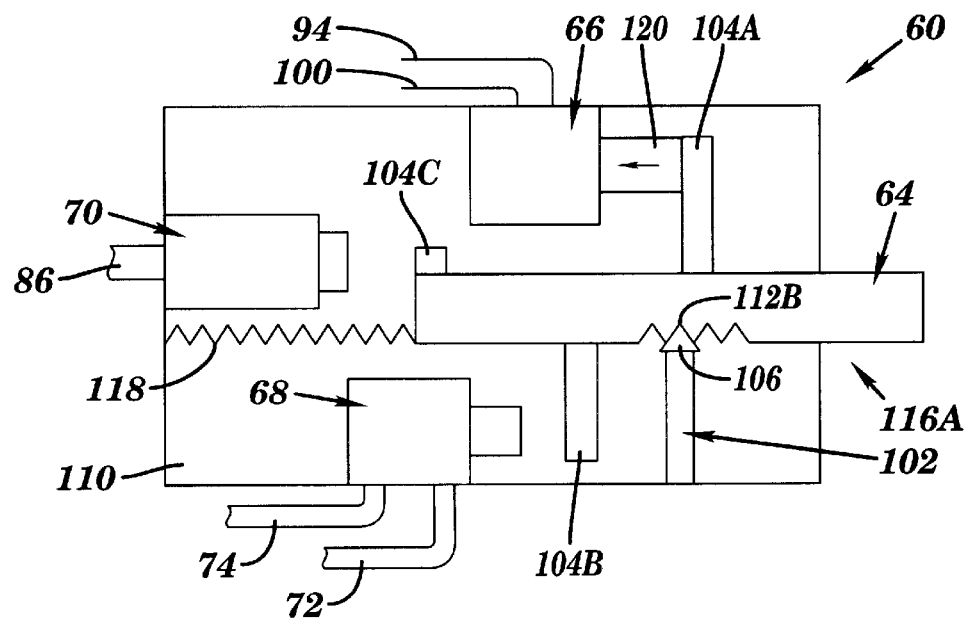
FIG. 9 illustrates a schematic view of the control element in a first position selecting a light switch apparatus.

FIG. 8 illustrates the control element 64 in the "neutral position" 114. The tip member 106 of the detent apparatus 102 is engaged with the notch 112A. FIG. 9 illustrates the control element 64 in the first position 116A. The tip member 106 of the detent apparatus 102 is engaged with the notch 112B. The first member 104A of the control element 64 has depressed a plunger 120 of the light switch apparatus 66. The light switch apparatus 66 is activated and the light source 18B is illuminated (FIG. 7).

Figure 10:
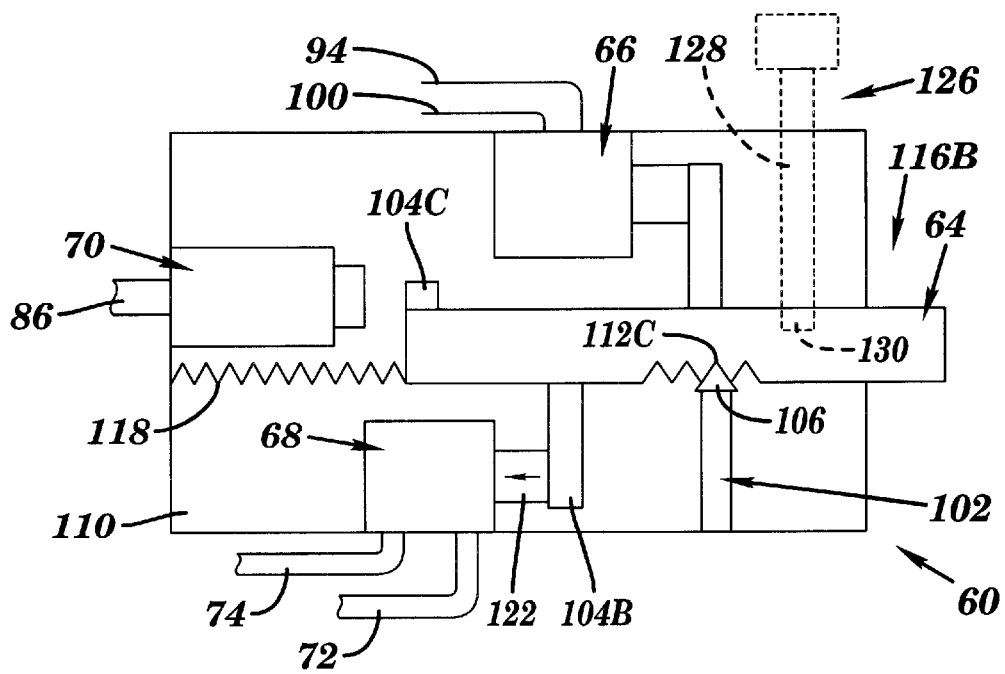
FIG. 10 illustrates a schematic view of the control element in a second position selecting a gas flow control apparatus.

FIG. 10 illustrates the control element 64 in the second position 116B. The tip member 106 of the detent apparatus 102 is engaged with the notch 112C. The second member 104B of the control element 64 has depressed a plunger 122 of the gas flow control apparatus 68. The gas flow control apparatus 68 is activated and gas 38 is allowed to flow from the tank 30B to the burner 62 (FIG. 7).

Figure 11:
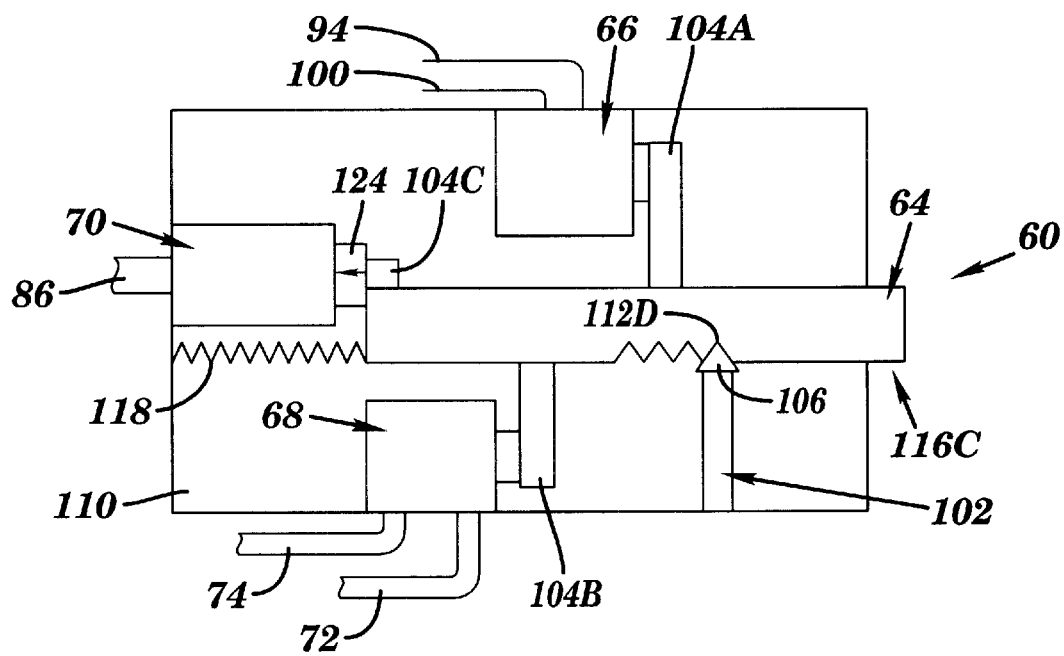
FIG. 11 illustrates a schematic view of the control element in a third position selecting an ignition apparatus.

FIG. 11 illustrates the control element 64 in the third position 116C. The tip member 106 of the detent apparatus 102 is engaged with the notch 112D. The third member 104C of the control element 64 has depressed a plunger 124 of the ignition apparatus 70. The ignition apparatus 70 is activated and sends an electric current through the conduit 86 to the sparking element 88 which ignites the gas 38 in the burner 62 (FIG. 7).

The operator may allow the control element 64 to return to the second position 116B as illustrated in FIG. 10. In this position the gas 38 is flowing to the burner to maintain a flame, and the light source 18 is shining light 91 upon the object 22. As illustrated in FIG. 10, the operator may press upon a pin 128 of a locking pin apparatus 126 to hold the control element 64 in the second position 116B. The locking pin 128 passes through the housing 110 and presses into a recess 130 of the control element 64. To release the control element 64, the operator lifts the pin 128 out of the recess 130 of the control element 64.

The operator operates the illumination device 10B by depressing an end 132 of the control element 64 so that the control element 64 is in the first position 116A (FIG. 9). The end 132 of the control element 64 protrudes beyond the handle 58 (FIG. 7). In this first position 116A, the light source 18B is illuminating the object 22. The operator then depresses the end 132 of the control element 64 so that the control element 64 is in the second position 116B (FIG. 10). The gas 38 flows from the tank 30B to the burner 62 (FIG. 7). The operator then depresses the end 132 of the control element 64 so that the control element 64 moves to the third position 116C (FIG. 11). The gas 38 is ignited by the sparking element 88 and the gas 38 ignites in the burner 62 (FIG. 7). The operator then holds the control element 64 in the second position 116B or uses the locking pin apparatus 126 to secure the control element 64 in the second position 116B. The gas 38 flows and burns in the burner 62. To turn off the gas 38 and the light source 18B, the operator releases the locking pin apparatus 126 and the resilient member 118 returns the control element 64 to the "neutral position" 114 (FIG. 8).

Figure 12:
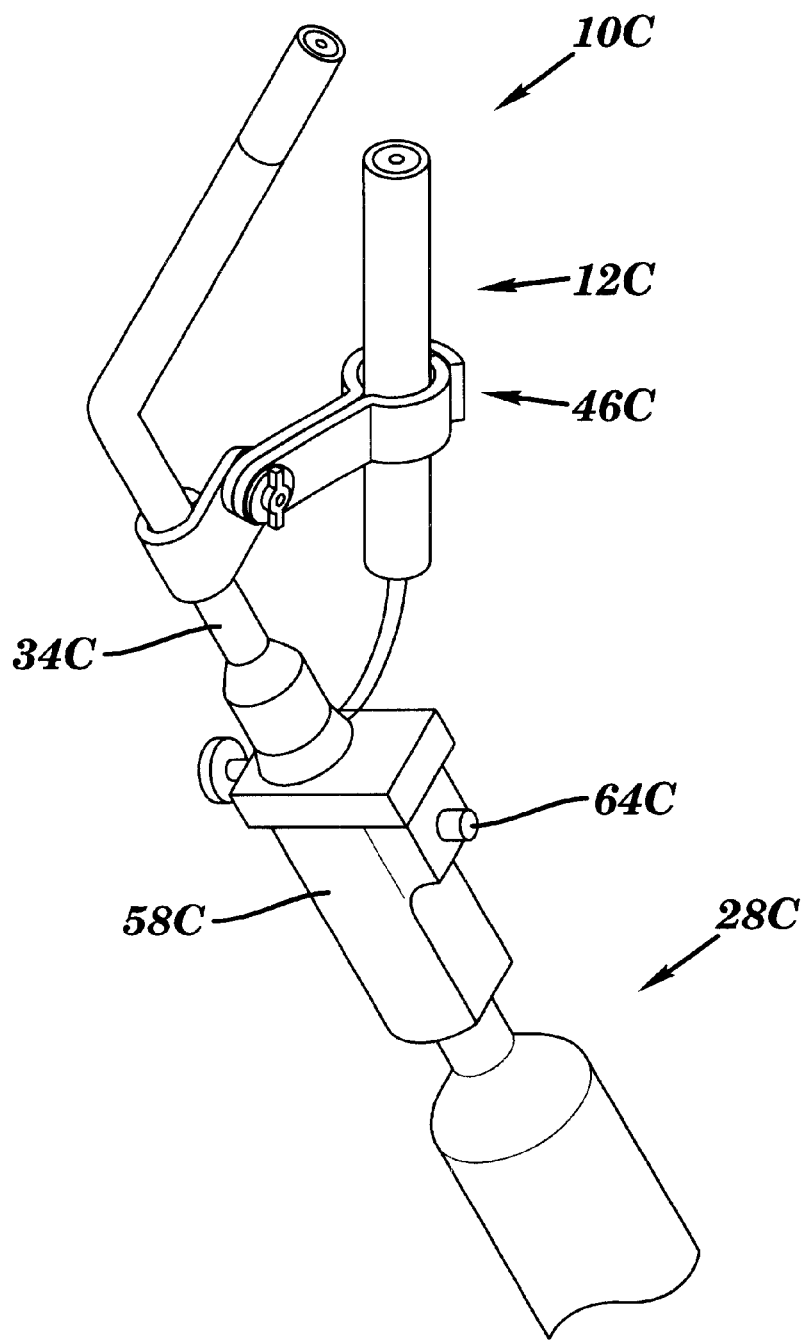
FIG. 12 illustrates a perspective view in accordance with a fourth embodiment of the illumination device including a light producing device attached to a tube of the portable gas torch.

FIG. 12 illustrates a fourth embodiment of the illumination device 10C. The illumination device 10C includes a light producing apparatus 12C attached to a tube 34C of a portable gas torch 28C using a clamping apparatus 46C similar to the clamping apparatus 46 in FIG. 1. The tube 34C is attached to a handle 58C of the portable gas torch 28C. The illumination device 10C includes a control element 64C that operates the illumination device 10C in a similar manner to the control element 64B (FIGS. 7–11).

The foregoing description of the present invention has been presented for purposes of illustration and description. It is not intended to be exhaustive or to limit the invention to the precise form disclosed, and many modifications and variations are possible in light of the above teaching. For example the illumination device 10 may be used with any suitable device (hand tool, dentistry tool, etc.) to provide illumination of an object 22. Such modifications and variations that may be apparent to a person skilled in the art are intended to be included within the scope of this invention as defined by the accompanying claims.

I claim:

1. An apparatus comprising:
   a handle;
   a light producing apparatus; and
   a control apparatus attached to the handle, wherein the control apparatus includes a control element for selecting a mode of operation of a gas torch, wherein in a first position, the control element selects a light switch apparatus for turning on or off a light source in the light producing apparatus, wherein in a second position the control element selects a gas flow control apparatus for turning on or off a gas flow to a burner, and wherein in a third position, the control element selects an ignition apparatus for igniting the gas in the burner.

2. The apparatus of claim 1, wherein the light producing apparatus includes a battery, a light bulb for generating a light and a lens for focusing the light onto an object.

3. The apparatus of claim 1, wherein the control element includes an end protruding outside the handle for an operator to depress.

4. The apparatus of claim 1, further including a tank for supplying the gas flow.

5. The apparatus of claim 1, further including a pressure regulator apparatus for regulating the pressure of the gas flowing to the burner.

6. The apparatus of claim 1, wherein the ignition apparatus includes a piezoelectric ignitor.

7. The apparatus of claim 1, wherein the control apparatus further includes an override switch for deactivating the light in the light producing apparatus.

8. The apparatus of claim 1, further including a tube connecting the burner with the handle and carrying gas from the handle to the burner.

9. The apparatus of claim 1, further including a locking pin for selectively holding the control element in the second position.

10. The apparatus of claim 1, further including a resilient element for biasing the control element to a neutral position when the control element is released, wherein in the neutral position the light producing apparatus, the gas flow control apparatus and the ignition apparatus are deactivated.

11. The apparatus of claim 10, further including a detent apparatus for allowing an operator to locate the neutral position, the first position, the second position, and the third position of the control element.

12. The apparatus of claim 1, wherein the light producing apparatus is attached to the handle.

13. The apparatus of claim 8, wherein the light producing apparatus is attached to the tube.

14. A method comprising:
   providing a light producing apparatus;
   attaching the light producing apparatus to a portable gas torch; and
   providing a control apparatus attached to the portable gas torch, wherein the control apparatus includes a control element for selecting a mode of operation of a gas torch, wherein in a first position, the control element selects a light switch apparatus for turning on or off a light in the light producing apparatus, wherein in a second position the control element selects a gas flow control apparatus for turning on or off a gas flow to a burner, and wherein in a third position, the control element selects an ignition apparatus for igniting the gas in the burner.

15. An apparatus comprising:
a handle;
a light producing apparatus; and
a control apparatus attached to the handle, wherein the control apparatus includes a control element for selecting a mode of operation of a gas torch, wherein in a first position, the control element selects a light switch apparatus for turning on or off a light source in the light producing apparatus, wherein in a second position the control element selects a gas flow control apparatus for turning on or off a gas flow to a burner, and wherein in a third position, the control element selects an ignition apparatus for igniting the gas in the burner, and wherein the control apparatus further comprises a pin to lock the control element in the second position for maintaining gas flow during operation of the gas torch.

* * * * *